United States Patent [19]

Dash

[11] 3,972,111

[45] Aug. 3, 1976

[54] SURFACE PREPARATION METHOD

[75] Inventor: Edward Dash, Long Beach, Calif.

[73] Assignee: McDonnell Douglas Corporation, Long Beach, Calif.

[22] Filed: Mar. 13, 1975

[21] Appl. No.: 557,977

[52] U.S. Cl. .................................. 29/458; 29/460; 219/91; 219/118; 228/175; 156/22; 156/285
[51] Int. Cl.² .................... B23P 3/00; B23P 25/00
[58] Field of Search ............... 29/458, 460; 219/87, 219/91, 92, 118; 156/91, 6, 16, 22, 281, 285; 228/175, 256, 101

[56] References Cited

UNITED STATES PATENTS

| | | | |
|---|---|---|---|
| 1,184,750 | 5/1916 | Jenkins | 24/150 DP |
| 1,712,531 | 5/1929 | Torelli | 24/150 DP |
| 2,361,860 | 10/1944 | Mason | 24/150 DP UX |
| 2,366,244 | 1/1945 | Ellerstein | 24/150 DP |
| 2,945,778 | 7/1960 | Lipinski | 156/22 X |
| 3,283,401 | 11/1966 | Pijls | 228/175 |
| 3,291,957 | 12/1966 | Bodine | 219/91 |
| 3,337,711 | 8/1967 | Garscia | 219/92 |
| 3,367,799 | 2/1968 | Beyerle | 156/22 X |
| 3,382,547 | 5/1968 | Hoefer | 24/150 DP |
| 3,416,975 | 12/1968 | Pollack et al. | 156/22 X |
| 3,455,775 | 7/1969 | Pohl et al. | 156/22 X |
| 3,728,763 | 4/1973 | Warzecha | 24/150 DP |
| 3,838,495 | 10/1974 | Kuhnert | 29/458 |

FOREIGN PATENTS OR APPLICATIONS

| | | | |
|---|---|---|---|
| 559,310 | 6/1958 | Canada | 219/92 |
| 257,258 | 2/1928 | Italy | 24/150 P |
| 272,012 | 2/1951 | Switzerland | 206/343 |
| 570,033 | 6/1945 | United Kingdom | 219/92 |

Primary Examiner—Charlie T. Moon
Attorney, Agent, or Firm—John P. Scholl; Walter J. Jason; Donald L. Royer

[57] ABSTRACT

A method of preparing surfaces of metallic components which are to be adhesive bonded and spot welded is described. The faying surfaces are first prepared for adhesive metal bonding using the most modern effective solutions available for highest strength and corrosion resistance. A primer may be applied upon the faying surfaces for improved corrosion resistance. The surfaces are then abraded in selected areas for spot welding. After spot welding, a bonding adhesive is introduced along one edge of the joint and capillary action assisted by a vacuum draws the adhesive over the entire area of the joint. Alternately, after abrading the selected areas, the adhesive is applied to the faying surfaces, and the spot welding is then accomplished at the abraded areas.

7 Claims, 6 Drawing Figures

SURFACE PREPARATION METHOD

BACKGROUND OF THE PRESENT INVENTION

Spot welding has been used for many years in industry, in preference to riveting, for joining sheet metal because of its low cost. However, although spot welding has largely supplanted riveting for many applications, engineers have been reluctant to use spot welding on highly stressed components, (as on airplanes, for example), because of the relatively low fatigue strength of spot welds compared to riveting.

In recent years, it has been found that when metals are joined by spot welding but the joint is also reinforced with a structural adhesive, it develops a fatigue strength significantly greater than a riveted joint. This method of joining metal members, such as aluminum alloy, is called "weld bonding" or "adhesive-spot-welding." This method has generally included the steps of cleaning and etching the surfaces and applying an adhesive upon the faying surfaces to be joined and then spot welding through the adhesive. Another approach of the method has been to clean and etch the surfaces, spot weld, and then apply the adhesive along the edges of the joint, allowing the adhesive to flow into the joint interface by capillary action. After either approach above, the adhesive in the joint is cured by placing the joined metals in an oven for a suitable heat cycle. Since weld-bonding is more economical than riveting, and its fatigue strength is greater, engineers hereafter will probably specify its use in lieu of riveting on highly stressed parts such as aircraft fuselages.

In order to obtain successful usage of weld-bonding in industry, it is generally recognized that weld bonded joints should be characterized by:
1. Consistently high adhesive strength, and
2. Consistently high strength spot welds, and
3. Consistent durability in a variety of corrosive environments.

The problem in the past was to get a surface preparation which was compatible with obtaining all these elements. For example, a sodium dichromatic/sulfuric acid etch has been used to prepare aluminum surfaces for adhesive bonding. However, this treatment, which provides excellent adhesive bonded joint strengths, has been shown to degrade seriously the quality and uniformity of the spot weld. On the other hand, the use of a spot-welding cleaning etch which provided high quality welds, also provides significantly lower adhesive bonded joint strengths and durability.

Better and more consistent spot welds are obtained in the procedural approach above where the spot welding is done first on bare metal and the adhesive is applied after the spot welding. This is because optimum spot welds require high cleanliness without contaminants and frequently the adhesive constitutes a contaminant when using the weld through approach. But when the spot welding is done first and the adhesive flow-through the joint depends on capillary action alone, the adhesive coverage over the entire joint area is often incomplete and frequently contains many areas devoid of adhesive.

Finally, use of a corrosion resistant primer cannot be used readily in weld-bonding with prior methods of surface preparation because the primer must be cured prior to any subsequent processing, and the cured primer acts as an electrical insulator which precludes the formation of acceptable spot welds.

SUMMARY OF THE PRESENT INVENTION

The present invention effectively solves the problems of former methods used for weld-bonding by using the following procedure:
1. Provide the optimum surface preparation cleaning and etching procedure for optimum strength joints and corrosion resistance for adhesive metal bonding.
2. If necessary, apply and cure a corrosion resistant primer to the surfaces prepared by step 1 above.
3. Abrade small matching circular areas upon the faying surfaces, thereby removing the primer and the chemical residues remaining from the surface preparation in step 1.
4. Spot weld the parts together at the abraded areas using a suitable template.
5. Introduce a high strength structural adhesive with low viscosity on one edge of the welded parts and
6. Provide a vacuum to assist the capillary flow of the adhesive through the joint until it becomes visible at the opposite edge to assure complete coverage.
7. If necessary, cure the weld-bonded assembly using a suitable heat cycle.

Where a primer is used as in step 2 above, an alternate more costly method of providing a clearance through the primer for spot welding without abrading the primer itself is:
1A. Apply masking discs upon the surfaces (between steps 1 and 2 above).
2B. Remove the masking discs from the surfaces (between steps 2 and 3 above).

DETAILED DESCRIPTION OF ILLUSTRATIVE EMBODIMENT

The novel surface preparation of this invention provides for the highest strength corrosion resistant adhesive bond together with the highest strength spot welds.

Figure 1:
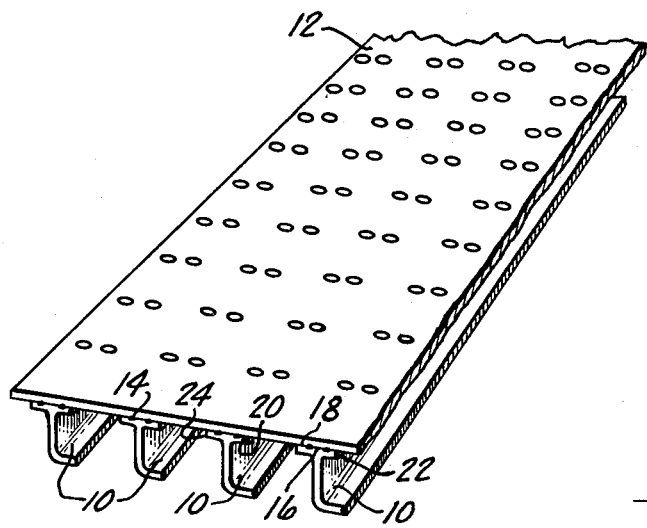
FIG. 1 is an isometric view of a skin-stringer assembly in which the stringers have been joined to the skin by weld bonding.

In FIG. 1 there is shown a plurality of stringers 10 joined to a metal skin 12 by means of spot welds 14 and an adhesive 16. These spot welds are spaced along the faying surfaces of the skin and stringers and the adhesive covers the rest of these surfaces. Two techniques of the weld bonding process may be used. One technique is to apply the adhesive 16 first to the interface surfaces 18, 20 of the stringer 10 and skin 12 and placing the stringer 10 in position against the skin 12. After placing the stringers in position against the skin they are spot welded together "through" the adhesive 16.

Actually, the word "through" is a misnomer because the pressure of the welding electrodes is sufficient to extrude the adhesive away from the weld area. However, there is a principle objection to this technique, namely: Under production conditions, often residual quantities of the adhesive remain in the weld area, creating a contaminant with resulting lower strength spot welds.

The other technique is first to spot weld the stringers 10 to the skin 12 and then apply adhesive 16 at one edge 22 of the stringer 10. The adhesive is a fluid type and flows into the very narrow gap (approximately 0.003 inch) by capillary action. A vacuum drawn along the opposite edge 24 may assist the flow of adhesive until it becomes visible at this edge to assure complete coverage.

Figure 2:
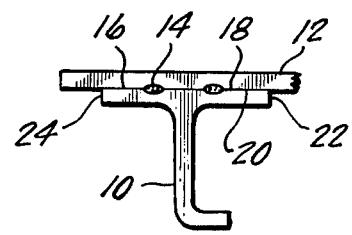
FIG. 2 is an enlarged end view of one of the stringers joined to the skin in FIG. 1.
Figure 2A:
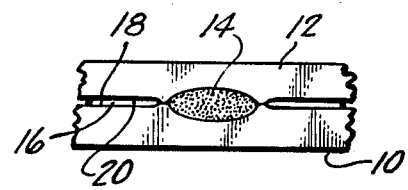
FIG. 2A is a further enlarged view of a welded portion shown in FIG. 2.

As shown in FIG. 2 and FIG. 2A the stringers 10 and metal skin 12 are bonded together by welds 14 and an adhesive 16 applied between the faying surfaces 18, 20.

Figure 5:
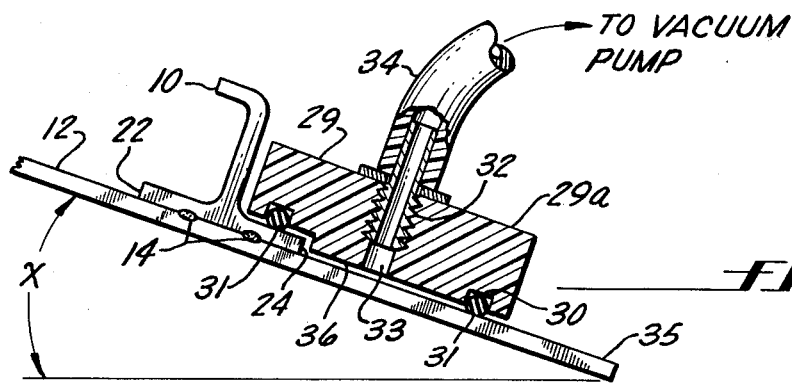
FIG. 5 is an end view of a stringer spot welded to the skin, together with a vacuum device used to draw adhesive between the faying surfaces.

The vacuum device 29 shown in FIG. 5 is utilized when a vacuum assist is desired in the capillary approach. It consists generally of a plexiglas body 29a with recesses 30 into which circular neoprene rubber inserts 31 are glued. An adapter 32 screws into the hole 33, and an air hose 34 fits upon the adapter and extends to the vacuum pump. A number of such fittings 32 and hoses 34 may extend along the length of the body 29a. The device is positioned upon the longeron 10 so that the rubber inserts 31 rest upon the longeron cap and the skin 12.

In applying the adhesive, the spot welded assembly 35 is positoned at an angle X edge approximately 30°–45° and adhesive is introduced along the edge 22. When the vacuum pump (not shown) is activated, a vacuum is created in the chamber 36. After a period of time, the adhesive flows through the joint and exits along the edge 24. The transparent plexiglas body 29 allows a visual check on the emerging adhesive at edge 24.

Prior to spot welding and application of the adhesive or vice versa, the faying surfaces of the stringer and skin must be cleaned and properly prepared for both the spot welding and the adhesive. In accordance with the method of this invention, all surfaces are first prepared in a condition which is most adaptable for metal bonding alone (without regard to spot welding). Thus, the surfaces may be etched with a sodium dichromate-sulphuric acid solution, or the latter solution with additions of aluminum and copper to enhance corrosion resistance. The surfaces may be etched with any other chemical solution which in the future may be found to be a superior etchant for metal bonding. Thus the solution is chosen for optimum strength and corrosion resistance for metal bonding without consideration of the resulting surface condition for spot welding.

However, the present etching solutions for bonding purposes are not acceptable for spot welding since the surface resistance varies widely, such as from 200 to over 2000 microhms in an aluminum surface, for example. Surfaces with such widely varying resistance are difficult if not impossible to weld with the strength and consistency required of quality spot welds because metal expulsion, nugget cracks and erratic shear strengths frequently occur.

Figure 3:
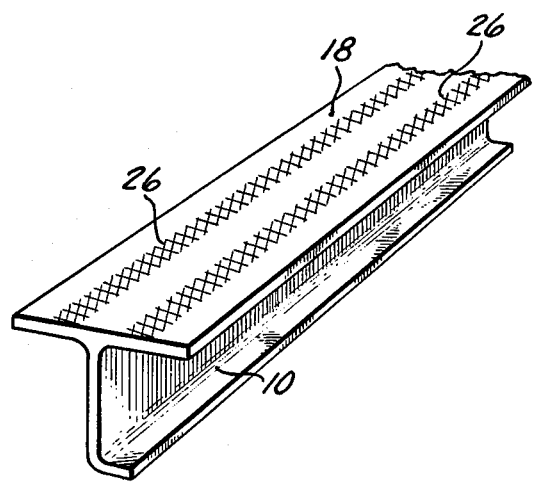
FIGS. 3 and 4 are isometric views of alternate examples of surface preparation.
Figure 4:
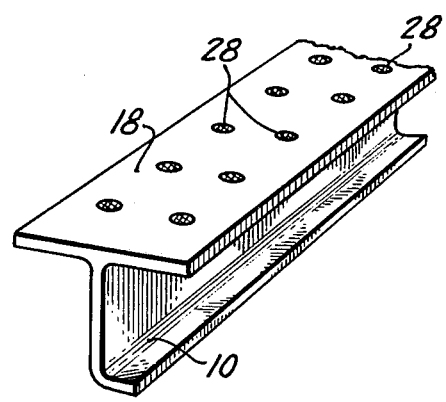

To prepare selected areas for spot welding, a suitable template is prepared and positioned on the faying surfces with template openings corresponding to those areas at which spot welding is desired. One such configuration is shown on stringer surface 18 in FIG. 3 and another configuration in FIG. 4. In FIG. 3 the spaced parallel cross-hatched strips 26 are under the open spaces of a template and so are the cross-hatched smaller areas 28 in FIG. 4. A rotary stainless steel wire brush, actuated by a 3000 R.P.M. motor typically with a 6-inch diameter and 0.010 inch diameter wires, is used to abrade these selected areas. Corresponding areas on the skin (not shown) are similarly abraded by power wire brushing. The resultant surfaces are ideal for resistance spot welding, with uniformly low surface resistance on the order of 5 to 25 microhms, well below the 100 microhms or less standard requirement.

If it is desired that a primer be used for additional strength and corrosion resistance of the adhesive bond, the primer may be applied directly upon the optimum etched surfaces for metal bonding described above. As before, to prepare selected areas for spot welding, the template is positioned on the faying surfaces, and wire brushing may proceed as described above. However, in this case, the primer as well as the chemical residues left by the metal bond etchant solutions are removed simultaneously at each of the selected areas in one operation.

It has been determined that when spot welds are made in joining stringers 10 to skin 12, on such prepared surfaces the welds are consistently of high strength and of high quality.

After the spot welding operation has been completed, the fluid adhesive is then applied to one of the joined edges and a vacuum as previously described is drawn along the other to assist the capillary action between the faying surfaces. When the adhesive appears along this edge, the surfaces have been fully coated. A two-part epoxy adhesive such as Hysol EA 9313 made by Hysol Division of Hexter Corporation is one such adhesive that may be used.

The advantages of this dual step surface preparation are that not only can optimum spot welds be obtained but also optimum adhesive bonds can be obtained with optimum corrosion resistance.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art.

What is claimed is:

1. A method of preparing faying metal surfaces for adhesive-spot-welding comprising metal bond etching said surfaces, abrading portions of the metal bond etched surfaces to subsequently accept a spot weld within each of said abraded portions, spot welding said abraded portions, and introducing an adhesive to cover all unabraded faying surfaces.

2. A method of preparing faying surfaces for adhesive-spot-welding as in claim 1 wherein said etching is done with a sulphuric acid-sodium dichromate solution with copper and aluminum added.

3. A method of preparing faying surfaces for adhesive-spot-welding as in claim 1 wherein, after etching, the surfaces to be welded are masked and the exposed surfaces sprayed with a primer solution for corrosion resistance.

4. A method of preparing faying surfaces for adhesive-spot-welding as in claim 3 wherein the masking is removed and the surfaces unmasked and unprimed are abraded with a power driven rotary wire brush.

5. A method of preparing faying surfaces for adhesive-spot-welding as in claim 1 wherein resistance spot welding is done before the adhesive is introduced.

6. A method of preparing faying surfaces as in claim 5 wherein the adhesive is applied along one edge of said faying surfaces and a vacuum is drawn along the other to draw said adhesive between said faying surfaces to cover unwelded faying surface areas.

7. A method of preparing faying surfaces for adhesive-spot-welding as in claim 1 wherein said surfaces prepared by metal bond etching are then sprayed with a primer before abrading.

* * * * *